United States Patent
Elson et al.

(10) Patent No.: US 7,161,926 B2
(45) Date of Patent: Jan. 9, 2007

(54) LOW-LATENCY MULTI-HOP AD HOC WIRELESS NETWORK

(75) Inventors: Jeremy Elson, Culver City, CA (US); Lewis D. Girod, Culver City, CA (US); William J. Kaiser, Los Angeles, CA (US); William Merrill, Culver City, CA (US); Lars Fredric Newberg, Marina Del Rey, CA (US); Brian Schiffer, Culver City, CA (US); Katayoun Sohrabi, Santa Monica, CA (US)

(73) Assignee: Sensoria Corporation, San Diego, CA (US)

( * ) Notice: Subject to any disclaimer, the term of this patent is extended or adjusted under 35 U.S.C. 154(b) by 1041 days.

(21) Appl. No.: 10/188,514

(22) Filed: Jul. 3, 2002

(65) Prior Publication Data

US 2003/0012168 A1 Jan. 16, 2003

Related U.S. Application Data

(60) Provisional application No. 60/302,795, filed on Jul. 3, 2001, provisional application No. 60/343,312, filed on Dec. 21, 2001.

(51) Int. Cl.
*H04Q 7/24* (2006.01)
(52) U.S. Cl. .................................. 370/338; 455/434
(58) Field of Classification Search ................ 455/434; 370/332, 238, 328, 338
See application file for complete search history.

(56) References Cited

U.S. PATENT DOCUMENTS

| | | | |
|---|---|---|---|
| 4,649,524 A | 3/1987 | Vance | 367/13 |
| 4,812,820 A | 3/1989 | Chatwin | 340/518 |
| 4,855,713 A | 8/1989 | Brunius | 340/506 |
| 4,951,029 A | 8/1990 | Severson | 340/506 |
| 5,241,542 A | 8/1993 | Natarajan et al. | 370/95.3 |
| 5,247,564 A | 9/1993 | Zicker | 379/40 |
| 5,295,154 A | 3/1994 | Meier et al. | 375/1 |

(Continued)

FOREIGN PATENT DOCUMENTS

DE 19743137 A1 9/1997

(Continued)

OTHER PUBLICATIONS

G. Asada, et al., "Wireless Integrated Network Sensors (WINS)," SPIE vol. 3673, Mar. 1999.

(Continued)

*Primary Examiner*—Chau Nguyen
*Assistant Examiner*—Albert T. Chou
(74) *Attorney, Agent, or Firm*—Courtney Staniford & Gregory LLP

(57) ABSTRACT

A multi-radio sensor node is provided that includes two or more communication devices. The communication devices include radio frequency (RF) devices like radios. Each communication device supports simultaneous communications among multi-radio sensor nodes of respective independent network clusters. A network structure is provided that includes two or more local network clusters. Each local network cluster includes numerous multi-radio sensor nodes. Each communication device of a multi-radio sensor node supports communication among the multi-radio sensor nodes of a different one of the local network clusters so that simultaneous communications are supported among the multi-radio sensor nodes of the local network clusters. The multi-radio sensor nodes of the local network clusters determine their locations relative to the other multi-radio sensor nodes of the independent network clusters with which they communicate. The location determination includes performing timing synchronization via synchronization signals communicated among the local network clusters, and acoustic signaling.

2 Claims, 10 Drawing Sheets

U.S. PATENT DOCUMENTS

| | | | | |
|---|---|---|---|---|
| 5,428,636 | A | 6/1995 | Meier | 375/202 |
| 5,475,687 | A | 12/1995 | Markkula, Jr. et al. | 370/85.1 |
| 5,553,076 | A | 9/1996 | Behtash et al. | 370/95.3 |
| 5,659,195 | A | 8/1997 | Kaiser et al. | 257/415 |
| 5,732,074 | A | 3/1998 | Spaur et al. | 370/313 |
| 5,854,994 | A | 12/1998 | Canada et al. | 702/56 |
| 6,028,857 | A | 2/2000 | Poor | 370/351 |
| 6,208,247 | B1 | 3/2001 | Agre et al. | 340/539 |
| 7,013,138 | B1* | 3/2006 | Mahany | 455/434 |
| 2002/0196763 | A1* | 12/2002 | Reynolds et al. | 370/338 |
| 2003/0133422 | A1* | 7/2003 | Bims | 370/328 |
| 2004/0264379 | A1* | 12/2004 | Srikrishna et al. | 370/238 |
| 2006/0018285 | A1* | 1/2006 | Rodman et al. | 370/332 |

FOREIGN PATENT DOCUMENTS

| | | |
|---|---|---|
| EP | 0814393 A1 | 12/1997 |
| WO | WO 9917477 | 4/1999 |
| WO | WO 0054237 | 9/2000 |

OTHER PUBLICATIONS

H. Lohle, et al., "BorderMaster 2000—An Advanced Border Surveillance System," 1225 Electrical Communication, 2nd Quarter 1994, Paris, France.

M. Dong, et al., "Low Power Signal Processing Architectures For Network Microsensors," International Symposium on Low Power Electronics & Design (ISLPED), pp. 173-177, Jan. 1998.

T. H. Lin, et al., "CMOS Front End Components For Micropower RF Wireless Systems," Proceedings of the 1998 International Symposium on Low Power Electronics & Design (ISLPED), pp. 11-15, Aug. 1998.

S. Natkunanathan, et al., "A Signal Search Engine For Wireless Integrated Network Sensors," ASFL Annual Symposium, pp. 1-4, Mar. 2000.

G. Asada, et al., "Wireless Integrated Network Sensors: Low Power Systems on a Chip," Proceedings of the 1998 European Solid State Circuits Conference (ESSCIRC), pp. 1-8, The Hague, The Netherlands, Sep. 22-24, 1998.

G. Pottie, R&D Quarterly and Annual Status Report for AWAIRS for the period Jan. 1-Apr. 31, 1999, pp. 1-28, Apr. 31, 1999.

G. Pottie, et al., "Wireless Integrated Network Sensors: Towards Low Cost and Robust Self-Organizing Security Networks," SPIE Conference on Sensors, C3I, Information and Training Tech. for Law Enforcement, Boston, MA, pp. 1-10, Nov. 3-5, 1998.

L. Clare, et al., "Self-Organizing Distributed Sensor Networks," SPIE 13th Annual Symposium on Aerosense/Defense Sensing, Simulation and Controls, UGS Technologies and Applications Conference, Orlando, FL, pp. 1-9, Apr. 5-9, 1999.

J. Agre, et al., "Autoconfigurable Distributed Control Systems," Proceedings of the 2nd International Symposium on Autonomous Decentralized Systems (ISADS 95), Phoenix, AZ, pp. 162-168, Apr. 25-27, 1995.

J. Agre, et al., "Development Platform for Self-Organizing Wireless Sensor Networks," SPIE 13th Annual Symposium on Aerosense/Defense Sensing, Simulation and Controls, Unattended Ground Sensor Technologies and Applications Conference, Orlando, FL, pp. 1-12, Apr. 5-9, 1999.

K. Sohrabi, J. Gao, V. Ailawadhi, G. Pottie, "A Self-Organizing Wireless Sensor Network," Proc. 37th Allerton Conf. On Comm., Control, and Computing, Monticello, IL, Sep. 1999.

D.J. Baker and A. Ephremides, "The Architectural Organization of a Mobile Radio Network via a Distributed Algorithm," IEEE Transactions on Communications, vol. Com-29, No. 11, Nov. 1981, pp. 1694-1701.

J. Elson, L. Girod, and D. Estrin, "Fine-Grained Network Time Synchronization Using Reference Broadcasts," submitted to SIGCOMM 2002.

W. Merrill, K. Sohrabi, L. Girod, J. Elson, F. Newberg, and W. Kaiser, "Open Standard Development Platforms for Distributed Sensor Networks," Aerosense Conference, Orlando, FL, Apr. 2002.

M. Gerla and J. Tzu-Chich Tsai, "Multicluster, Mobile, Multimedia Radio Network, " ACM-Baltzer Journal of Wireless Networks, vol. 1, No. 3, pp. 225-265, 1995.

C. R. Lin and M. Gerla, "Adaptive Clustering for Mobile Wireless Networks."

* cited by examiner

LOW-LATENCY MULTI-HOP AD HOC WIRELESS NETWORK

RELATED APPLICATIONS

This application claims the benefit of U.S. Patent Application No. 60/302,795 filed Jul. 3, 2001 and No. 60/343,312 filed Dec. 21, 2001, both of which are currently pending and incorporated herein by reference in their entirety. This application is related to U.S. patent application Ser. No. 10/184,527, filed Jun. 28, 2002.

STATEMENT OF GOVERNMENT INTEREST

This invention was made with United States government support under Contract Number DAAE30-00-C-1055 awarded by the Defense Advanced Research Projects Agency (DARPA) Advanced Technology Office (ATO) and Contract Number F30602-99-C-0171 awarded by the DARPA Information Exploitation Office (IXO). The United States government may have certain rights in this invention.

FIELD OF THE INVENTION

The disclosed embodiments relate to robust low delay ad hoc wireless networks.

BACKGROUND

A basic assumption of ad hoc wireless networks is that there is no pre-existing network infrastructure. This means that the network nodes must establish communication routes among themselves in order to transfer information through the network. Algorithms devised for network self-assembly, clustering, and multi-hop routing include those described by K. Sohrabi, J. Gao, V. Ailawadhi, and G. Pottie in, "A Self-Organizing Sensor Network," Proc. 37$^{th}$ Allerton Conf. On Comm., Control, and Computing, Monticello Ill., September 1999. These algorithms can for example enable arbitrarily large networks to self-assemble, and permit multi-hop routing over large geographic areas under varying conditions of node mobility.

However, commercially available communication radios that enable wireless local area networks typically support only star network configurations. In the star network configuration one node of a cluster is designated as the master node, and the other nodes in the cluster are slave nodes that communicate only with the master node. Examples of typical protocols supporting the star network configuration include the IEEE 802.11 family of protocols including the 802.11a and 802.11b protocol, Hiperlan, and Bluetooth. The 802.11b protocol also includes an "ad hoc" mode, in which there is no single master node, but in which a local network of equal peer nodes is formed; each peer node can communicate directly with all other peer nodes. The advantages of the star network protocols include relatively simple network formation, ease of management of channel access, and ease of establishing and maintaining synchronism. Moreover, the low cost of such radios and the ubiquitous software support for them over many computing platforms make them attractive for a wide variety of applications.

The typical protocols supporting the star network configuration also have a number of problems. One problem with the star configuration protocols is that they do not easily support efficient multi-hop communication. For example, as described in the Related Applications, a protocol is described in which particular nodes of a network belong to multiple clusters of the network and, as such, communicate with multiple cluster heads. Unfortunately, when using a commercial radio that implements a media access control (MAC) protocol which assumes a star topology, the radios provide communication with multiple cluster heads by time-sharing communications between the cluster heads. The time-share communication significantly reduces the communication throughput of the network.

Furthermore, and even more detrimental, is that each time a node radio switches communication between different cluster heads, the radio encounters a start-up time delay as if it is being newly joined to the network. Consequently, communication delays are very large across multi-hop networks that rely upon MACs supporting a star configuration. This situation is further aggravated when using the 802.11b ad hoc mode because radios that are too far away for reliable communication with network nodes may still interfere with other links of the network, and there is no mechanism within the protocol for resolving these types of conflicts. Thus, formation of a reliable network is problematic.

Yet another problem encountered in star network configurations is that it is difficult to maintain a common timing base (synchronism) across cluster boundaries using the star network protocols. This makes it difficult to automatically establish network position or accurately time-stamp data, as may be important in sensor network applications.

Figure 1:
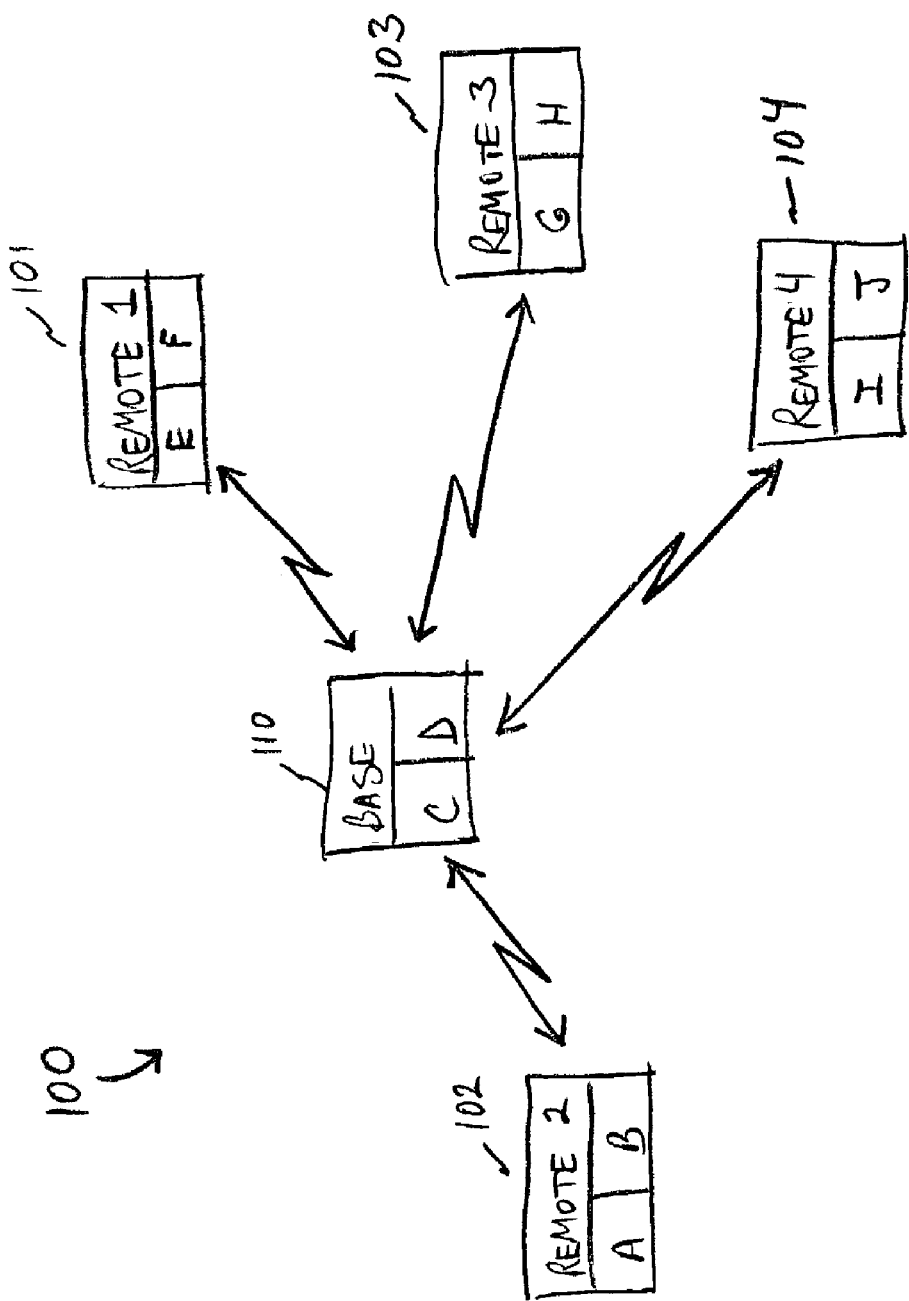
FIG. 1 is a point-to-multipoint wireless network cluster using a base-remote network configuration including multi-radio network nodes, under an embodiment.

In the drawings, the same reference numbers identify identical or substantially similar elements or acts. To easily identify the discussion of any particular element or act, the most significant digit or digits in a reference number refer to the Figure number in which that element is first introduced (e.g., element 400 is first introduced and discussed with respect to FIG. 4).

The headings provided herein are for convenience only and do not necessarily affect the scope or meaning of the claimed invention.

DETAILED DESCRIPTION

A multi-radio network node is provided herein that supports a multi-hop wireless network. The multi-radio nodes described below solve the long-standing problem that restricts most commercial spread spectrum modem solutions to local cluster/star networks. Each multi-radio network node, referred to herein as a multi-radio node, includes two or more commercially available communication radios or modems, and each radio supports communications with separate network clusters. The network, therefore, includes overlapped clusters in which nodes may belong to as many clusters as they have radios. This enables the use of standard commercial radios while permitting low-latency multi-hop networking, robustness in the form of alternate routing and ease of network reconfiguration, and ease of synchronization among clusters to facilitate position location and accurate time-stamping of sensor data. The multi-radio concept also enables the efficient use of radios with custom protocols to achieve the robustness and synchronization advantages.

FIG. 1 is a point-to-multipoint wireless network cluster 100 using a base-remote network configuration including multi-radio network nodes, under an embodiment. The cluster includes a base node 110 and four remote nodes 101–104, all of which include two radios A–J. While the nodes of this example include dual radios, alternative embodiments can include any number of radios. The base-remote, or master-slave, configuration provides for communication among the radios A–J of the nodes 101–110 by fixing the synchronization mechanism dictated by the base node 110 and all associated remotes 101–104. The remote nodes 101–104 communicate with one another via the base node 110. Any combination of radios A–J support communications among the remote nodes 101–104 and the base node 110. For example, a communication path between remote node 101 and remote node 102 may include radios E, D, and B, or alternatively E, D, C, and B.

Figure 2:
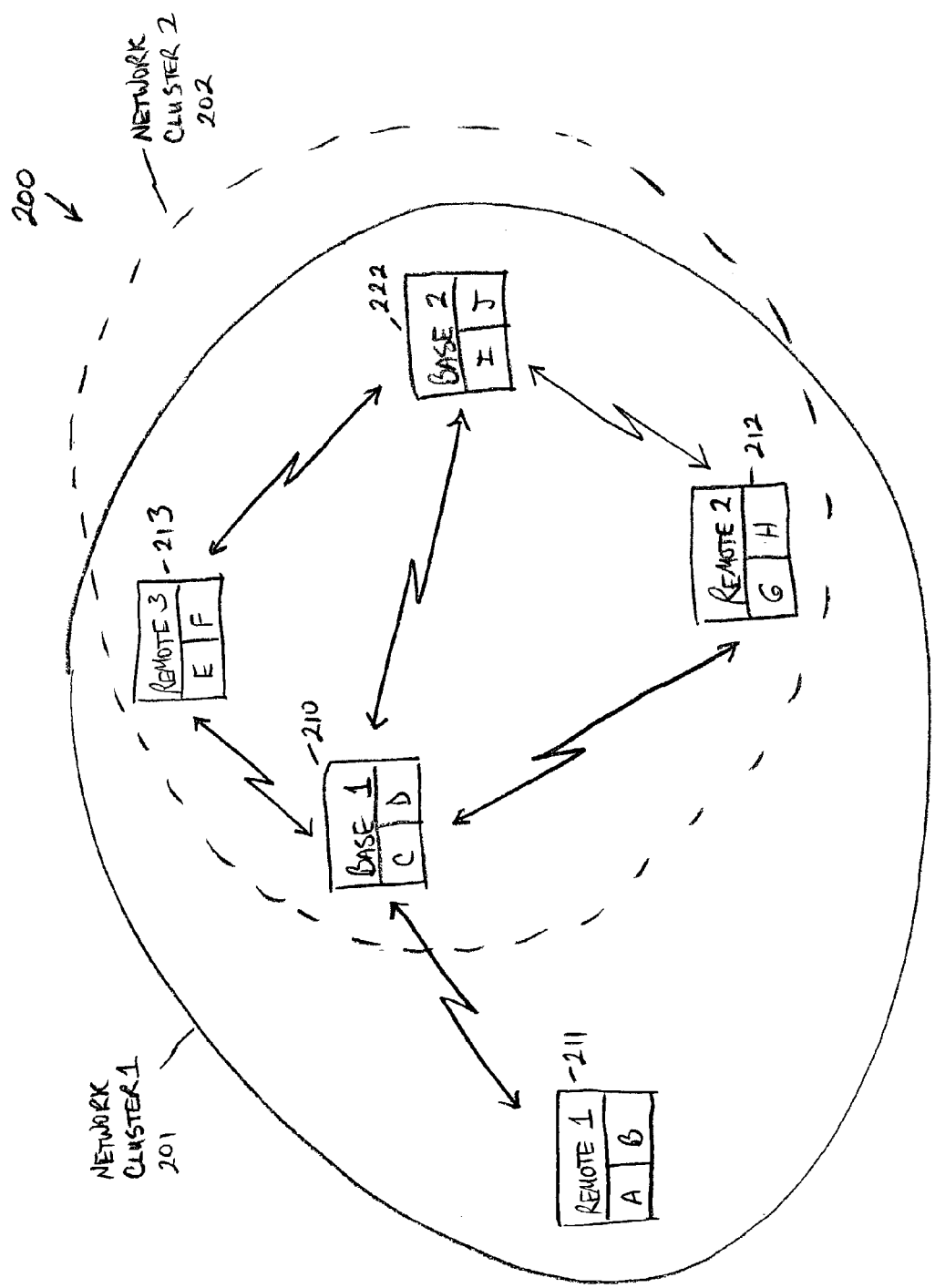
FIG. 2 is a block diagram of a network including two local network clusters with dual-radio network nodes supporting communication among the clusters, under an embodiment.
Figure 3:
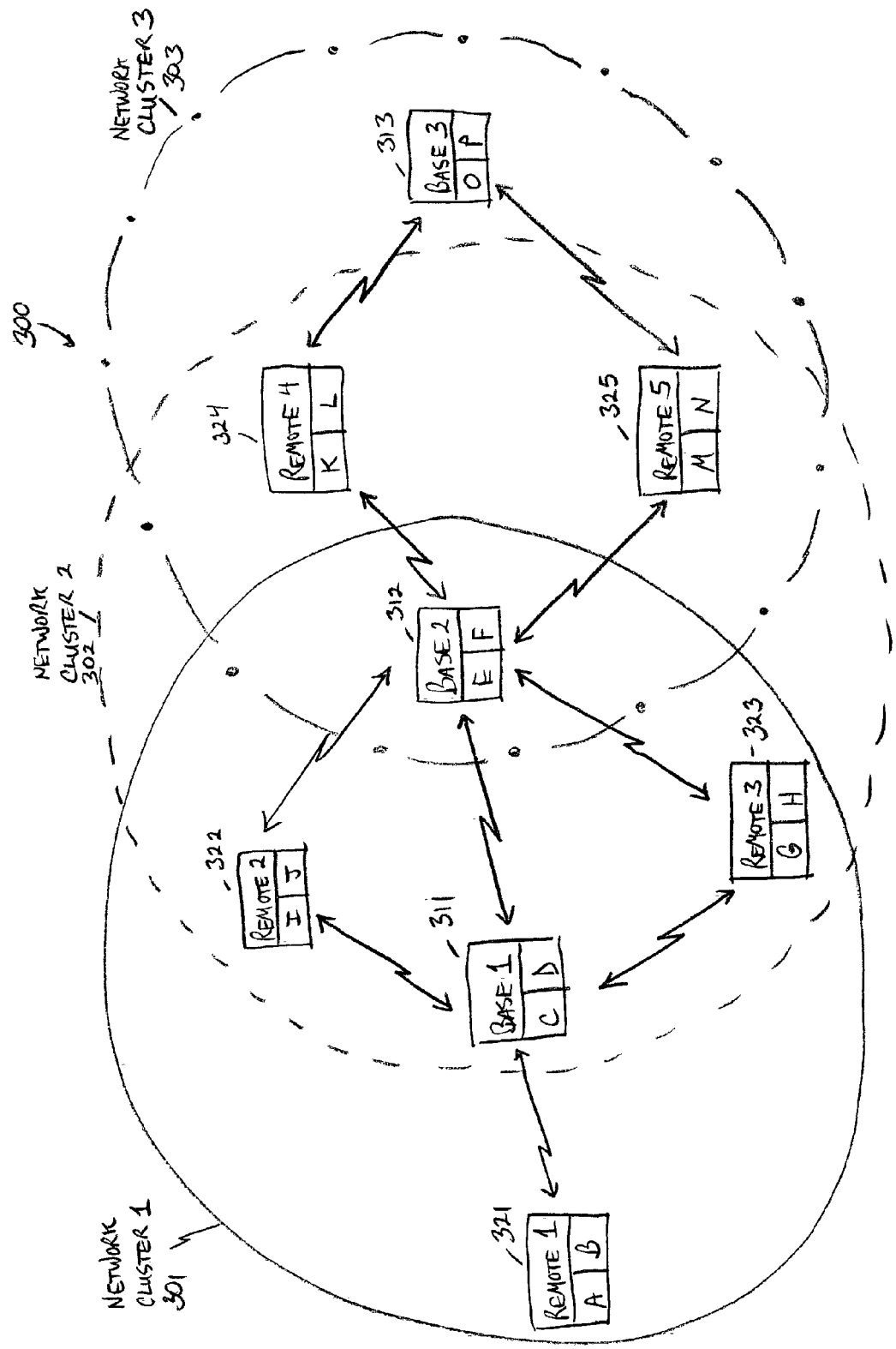
FIG. 3 is a block diagram of a network including three local network clusters with dual-radio nodes supporting communication among the clusters, under an embodiment.

The multi-radio nodes of an embodiment support communication among numerous clusters by enabling each node to operate on two or more star networks concurrently so that packets can be routed quickly between network clusters. In order for a node to communicate with any node outside of the cluster of which it is a member, the node synchronizes to a separate communication link with the outside node. FIG. 2 is a block diagram of a network 200 including two local network clusters 201 and 202 with dualradio nodes 210–222 supporting communication among the clusters, under an embodiment. FIG. 3 is a block diagram of a network 300 including three local network clusters 301–303 with dual-radio nodes 311–313 and 321–325 supporting communication among the clusters 301–303, under an embodiment.

With reference to FIG. 2, two local clusters 201 and 202 form the network. Local cluster 201 includes nodes 210–222, while local cluster 202 includes nodes 210, 212, 213, and 222. In this particular configuration, node 210 is the base node of local cluster 201, and node 222 is the base node of local cluster 2. Base node 210 communicates with all nodes of local cluster 201, including nodes 211–222. Base node 222 communicates with all nodes of local cluster 202, including nodes 210, 212, and 213. The remote nodes 211–213 communicate with one another via the base nodes 210 and 222. Numerous combinations of radios A–J support communications among the nodes of the local clusters 201 and 202. For example, a communication path between remote nodes 211 and 212 may include radios B, C, and G, or alternatively radios A, C, and H. A communication path between remote node 211 and base node 222 may include radios A, C, D, and I, or alternatively radios A, C, D, G, H, and J.

With reference to FIG. 3, three local clusters 301–303 form the network. Base nodes 311, 312, and 313 are the base nodes for local clusters 301–303, respectively. Communication among the nodes and clusters is as described above with reference to FIGS. 1 and 2.

Figure 4:
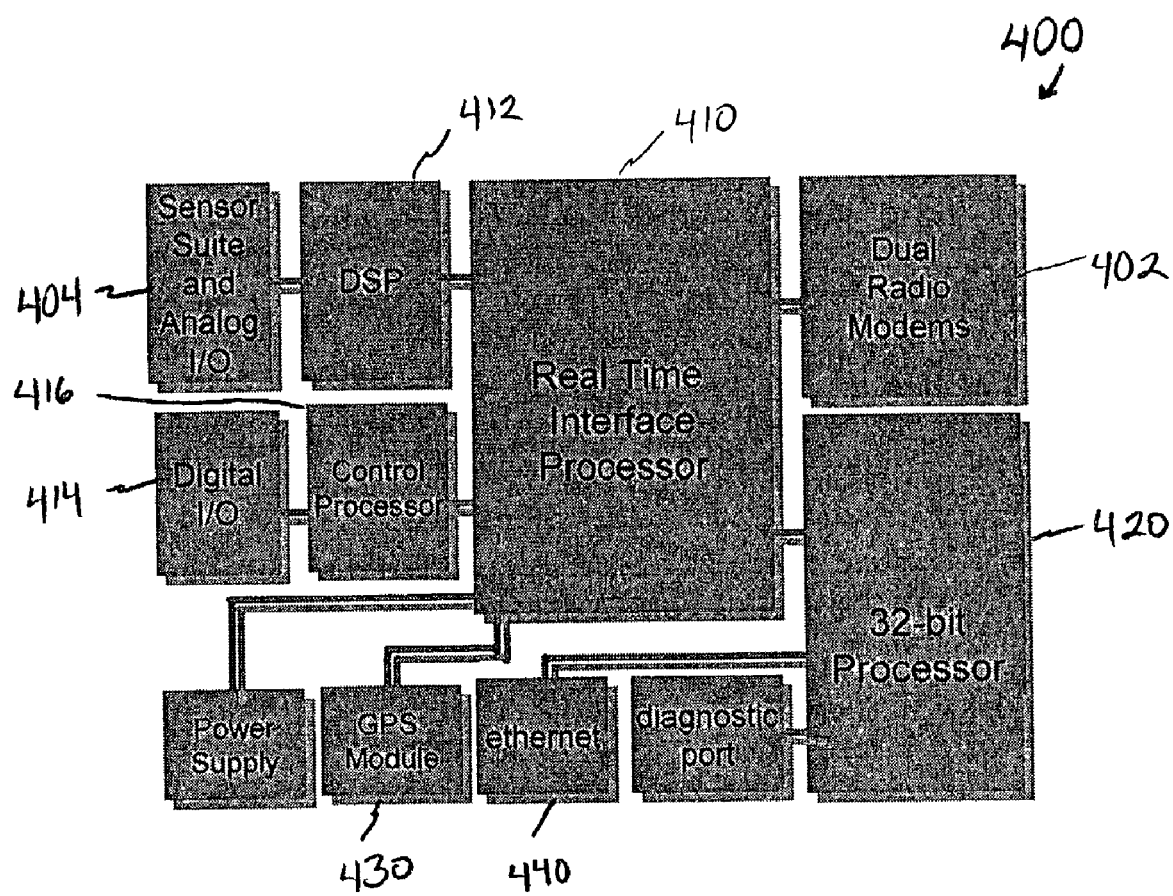
FIG. 4 is a block diagram of a multi-radio sensor node, under an embodiment.

In order to provide low latency packet transmission the multi-radio node of an embodiment provides multi-cluster access using dedicated hardware rather than by expanding the complexity of each individual modem. This provides a robust, scalable extension of the single network cluster architecture (a cluster corresponding to a synchronized channel between nodes) with the flexibility to support a large variety of networking algorithms. FIG. 4 is a block diagram of a multi-radio node 400, under an embodiment. This multi-radio node includes dual radio modems 402 like, for example, the WINS NG 2.0 network node available from Sensoria Corporation of San Diego, Calif. However, the multi-radio nodes described herein are not limited to two radios, and alternative embodiments of the nodes can include any number of radio modems.

Referring to FIG. 4, each of the radio modems 402 operates with Frequency Hopped Spread Spectrum (FHSS) signaling with transmission rates up to 56 kbps on each channel. The hopping is distributed over 75 channels within the 2.4 gigahertz (GHz) to 2.4835 GHz worldwide ISM band at a hopping rate of once per 14.375 milliseconds (ms) transmitting at 100 mW or 10 mW. Communication between base and remotes is synchronized within a time division multiple access (TDMA) cycle within each hop. At the beginning of a hop the base transmits first a synchronization signal, then any data in its buffer, followed in TDMA time slots by transmissions from each of the remotes synchronized by that base. The number of remotes dictates the time slot assigned to each remote and hence the packet size sent with the transmission set up to operate efficiently with up to 8 remotes. A larger number of remotes per base can be used. However, communication efficiency drops as the header size occupies increasingly large portions of each packet. While the base and remote channel is TDMA, from the API perspective the radios appear to communicate in full duplex mode as transmitted and received packets at a single modem are interleaved.

The multi-radio node 400 of an embodiment includes high performance analog sensor sampling 404, sensor signal processing 412, wireless network support, a 32-bit application processor 420 and a Portable Operating System Interface (POSIX)-compliant real-time operating system. The node platform architecture includes a Real Time Interface Processor (RTIP) 410 and supports high-speed multi-port sampling integrated with both a high-speed digital signal processor (DSP) 412 and direct digital input/output (I/O) 414. The RTIP 410 together with the associated DSPs 412 and control processors 416 are the preprocessor of the node 400.

The node 400 also includes a 32-bit Application Processor 420 with numerous memory devices including random access memory (RAM), read-only memory (ROM), and flash memory. The Application Processor 420, for example, the Motorola Power PC MPC 823 Rev A supplemented by 16 MB RAM and 8 MB flash memory, supports the QNX Neutrino POSIX-compliant, microkernel real time operating system (RTOS). Digital I/O 414 and Global Positioning System (GPS) 430 geolocation capability is provided with an attached active antenna.

The analog sensor interfaces 404 include two sets of interfaces. One set provides sampling rates from 1–25 kHz at 12-bit resolution, and the second set provides sampling from 1.88 to 101.1 Hz at 16-bit resolution, both with selectable gains. This provides support for a wide range of sensors. The sensor front-end high-speed input sample rate is accommodated in a power-efficient approach with a dedicated, programmable DSP 412, for example the Texas Instruments 5402. This DSP 412 is supplied with an integrated development environment. The DSP code may be communicated to the node 400 via a developer port or directly via the wireless network. The system also provides wireline interfaces with both 10 Mb ethernet 440 and RS-232 serial port access.

The multi-radio node 400 includes the software application programming interfaces (APIs), as described below. Node development may be conducted through the node ethernet port 440 or an RS-232 diagnostic port. The node 400 can mount a file structure on a remote machine, and development and file transfer is facilitated by the nodes capability to run telnet, tftp, and other file transfer protocols.

When a modem is powered on in operation and assigned to a specific network as a base node it acquires any remote nodes within range that are not already synchronized with another base node on the same channel. Similarly any remote nodes that are powered synchronize with any existing bases on their networks. Once every 256 hops each remote node re-registers with the associated base node, so that if a remote node disappears after registering with the network it will be noticed within approximately 4 seconds. Similarly if a base node disappears after registering with the network, its disappearance is discovered immediately by the associated remote nodes because the base node transmits a synchronization signal each hop. Modems appearing and disappearing on the wireless channel of an embodiment are passed through the API as connect or disconnect packets generated by each internal modem when they are no longer synchronized with a specific base node or remote node.

Within the modems of an embodiment each packet is sent with an automatic repeat request (ARQ) scheme that initiates retransmission of any lost packets at the physical layer up to 16 times based on a 24-bit checksum. The number of retransmissions is configurable, to modify communication as desired. However, the ARQ is only enabled for point-to-point transmissions. While every transmission from a remote node to the associated base node is point-to-point and hence uses the ARQ if configured, transmissions from a base node to a remote node may be point-to-point (if a specific node is addressed) or broadcast in which no retransmission is implemented. A one-byte checksum is also provided at the driver layer to provide error checking in the case of broadcast transmissions.

Additional feedback on the channel is provided through the Received Signal Strength Indication (RSSI) option of the radio API. This provides the power level averaged over the last ten frequency hops seen by a remote node. The RSSI value is not defined at a base node because each base node may be communicating with multiple remote nodes, while each remote node only communicates with a single base node. The RSSI value is the ten-hop average of the regular synchronization header transmitted from the base node at the start of each hop. The RSSI value provides a relative reference for that radio and outputs an integer value from 0 to 255.

The radio API provides access to support setting of the operational status of each modem (base or remote, transmit power, network, etc.); however, a default operational status is also provided based on a deterministic node layout. This initial network configuration facilitates quick use of the multi-hop nature of the network, while enabling overlay of a large variety of self-assembly, reconfiguration and routing protocols.

Within a dual-radio node of an embodiment two modems operate simultaneously, each on an independent network or cluster. The dual architecture facilitates passing information between clusters and allows messages to be passed between networks. For example, with reference to FIG. 3, the dual modems of each node 311–313 and 321–325 provide multiple paths among the nodes. Additionally, by transferring a message between each modem driver on a node the message can be passed over many hops like, for example, passing signals from remote node 321 to base node 313 of the network 300 via a path including base node 311, base node 312, and remote node 324. This communication path may use radios A, C, D, F, K, L, and O. Independent operation of the dual modems reduce the latency in message passing to that required to route information between each modem driver. The header of each packet passed up through the radio API enables directed routing as well as provides for packets to be passed along in a broadcast mode.

Since each dual-radio node is operating two independent modems, each node also has two radio frequency (RF) addresses. At the RF modem API level everything is referred to the RF address. For example, with reference to FIG. 3, rather than labeling the nodes with node numbers 311–313 and 321–325, the associated radios are addressed by the radio addresses A–P. This provides flexibility in building a routing table based on neighboring radio addresses. While the RF modem API returns the identities of all radios connected to a selected radio it does not specify at the API level to which node a radio is attached. The node thus provides the capability to pass messages between individual radios to ascertain which nodes they are associated with in order to build node-driven routing tables.

Networks including multi-radio nodes have a higher capacity for multi-hop transmissions through the network because the multi-radio nodes have the advantage of being able to conduct simultaneous transmissions through multiple channels. The multiple radio architecture provides a further advantage of increased robustness to degradations such as jamming because the radios may be tuned to independent channels. This architecture also provides a greater number of connection combinations or alternative communication paths between two nodes. Two radios per node is the minimum necessary for low-latency multi-hop communications where conventional MACs are used, but a larger number provides higher inter-cluster capacity.

Figure 5:
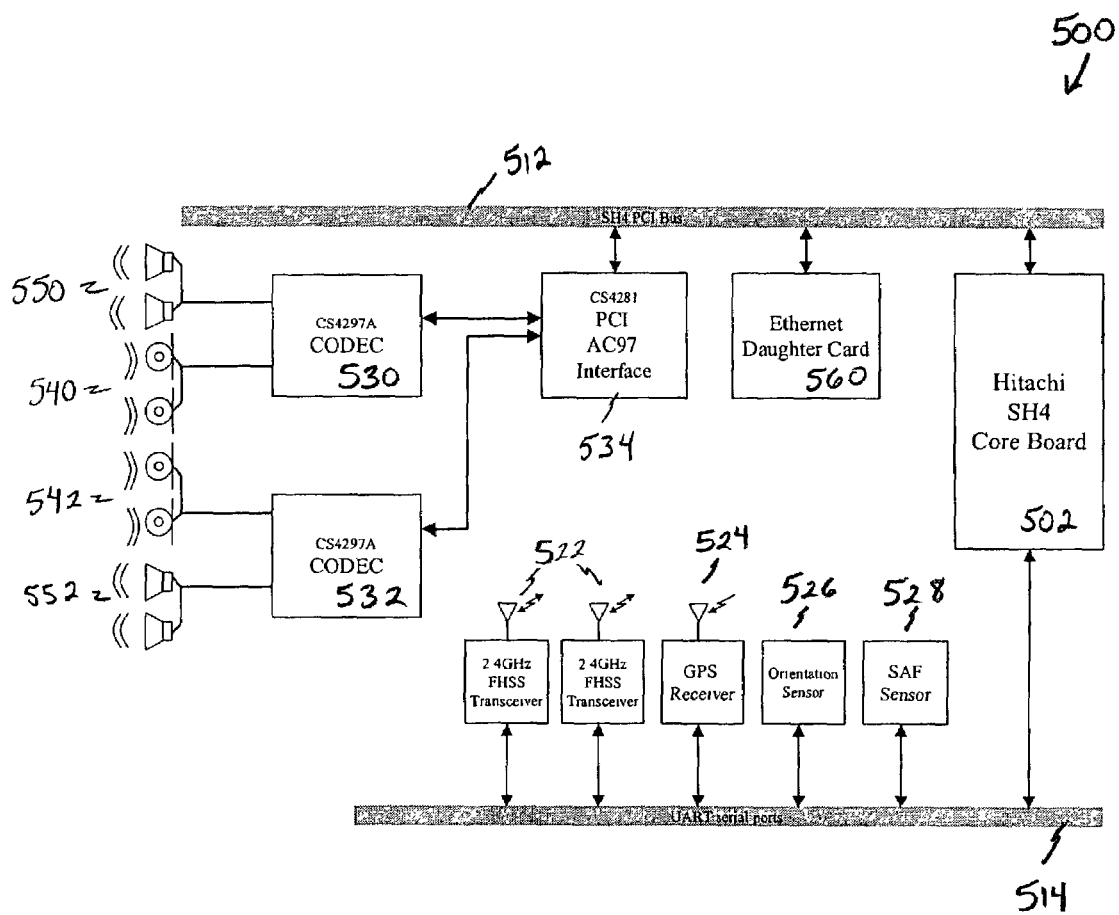
FIG. 5 is a block diagram of a multi-radio sensor node, under an alternative embodiment.

FIG. 5 is a block diagram of a multi-radio node 500, under an alternative embodiment. This node 500 includes a Hitachi SH4 core board 502 that includes a preprocessor and processor. The core board 502 is coupled among an SH4 peripheral component interconnect (PCI) bus 512 and universal asynchronous receiver/transmitter (UART) serial ports 514. In a dual-radio configuration, two 2.4 GHz FHSS transceivers 522 are coupled to the TART serial ports 514 along with a GPS receiver 524, orientation sensor 526, and SAF sensor 528. Each of two coder/decoders (CODECS) 530–532 couple to the PCI bus 512 via a PCI AC97 interface 534. Each coder/decoder (CODEC) 530–532 couples to two microphones 540–542 and two speakers 550–552, with the combinations being used for acoustic ranging, as described in detail below. An Ethernet card 560 couples to the PCI bus 512 for use in test and monitoring.

This node 500 includes a platform hardware configuration and software architecture that provides for shared resource access management. As further described below, and by W. Merrill, K. Sohrabi, L. Girod, J. Elson, F. Newberg, and W. Kaiser in "Open standard development platforms for distributed sensor networks," Aerosense Conference, Orlando, Fla., Apr. 5, 2002, and in the Related Applications, a Framework for User-Space Devices (FUSD) module or redirection module resides in kernel space and receives requests for access to resources from applications in user space. The FUSD module routes signals representative of the received requests to a device driver interface in user space. Components of the device driver interface include resource management modules and device drivers that correspond to available resources. The resource management modules generate queries to the device drivers regarding availability of the requested resources. Upon receipt of resource status information from the device drivers, components of the device driver interface generate schedules for granting access to the requested resources. Further, the device driver interface components control access to the resources in accordance with the generated schedules including issuing responses to the requesting applications and the device drivers of the requested resources.

The platform software architecture of the sensor nodes described herein uses the FUSD to program functions as applications together with a special driver or driver interface that acts as a proxy for the application at the device level, as described below and in the Related Applications. In this way the FUSD provides access to all drivers and most system resources, and makes use of the security and communications features already built into or onto a standard operating system such as Linux. In this manner, one or more software-exchange mechanisms can be layered on top of the operating system as the mechanisms become available, without the need for any modifications or extensions to the mechanisms in order to enable access to the devices.

Moreover, the platform software architecture permits secure distribution of applications and key management software across multiple platforms, enabling convenient upgrades of both hardware and software, management of network access by communications and computer peripherals, and cost-accounted and secure interactions among local networks. For example, the software architecture supports personal and handheld computers and their associate network of peripherals, industrial or home automation, security networks, and vehicular systems, for example.

The FUSD causes the open interface of the sensor node software architecture of an embodiment to appear to the application developer as if increased functionality is provided at the level of the accessed device drivers. This enables access from applications via the standard POSIX virtual file system (VFS). While actually adding the needed functionality within the system kernel (device driver level), the FUSD architecture provides access to the system drivers and resources. In this manner, one or more software-exchange mechanisms can be layered on top of the operating system without the need for any modifications or extensions to these mechanisms to enable access to the devices.

In typical device drivers there is a layer of indirection between applications (such as read or write) and devices (such as I/O ports). This layer of indirection is needed because there must be some point of synchronization between processes competing for serial resources. Typically, this is managed with "trusted" (verified, stable) code that runs in kernel space and which has direct access to hardware, memory, and other system resources. Unfortunately, device drivers residing in the kernel cannot access most user-space services such as files, the outside world (e.g., serial ports, network interfaces), or user-space libraries, and are unable to block or run for long periods of time. Moreover, typically it is very difficult to write and debug code that must run in the kernel. The FUSD architecture of an embodiment avoids these difficulties by fusing the kernel and user space.

The FUSD architecture, including a kernel module and a cooperating user-space library, is a Linux framework for proxying device file callbacks into user-space, allowing device files to be implemented by daemons instead of kernel code. Despite being implemented in user-space, FUSD devices can look and act just like any other file under/dev implemented by kernel callbacks.

A user-space device driver can do many of the things that kernel drivers can not, such as perform a long-running computation, block while waiting for an event, or read files from the file system. Unlike kernel drivers, a user-space device driver can use other device drivers—that is, access the network, talk to a serial port, get interactive input from the user, pop-up graphical user interface (GUI) windows, or read from disks, for example. Further, user-space drivers implemented using FUSD can be much easier to debug. Also, it is impossible for user-space drivers to crash the host platform, and they can be killed and restarted without rebooting even if they become corrupted. User-space drivers can also be swapped out, whereas kernel drivers lock physical memory.

The FUSD drivers are conceptually similar to kernel drivers in that they include a set of callback functions called in response to system calls made on file descriptors by user programs. The FUSDs C library provides a device registration function, similar to the kernel's devfs_register_chrdev( ) function, to create new devices. The fusd_register( ) function accepts the device name and a structure full of pointers. Those pointers are callback functions which are called in response to certain user system calls, for example, when a process tries to open, close, read from, or write to the device file. The callback functions should conform to the standard definitions of POSIX system call behavior. In many ways, the user-space FUSD callback functions are identical to their kernel counterparts.

The proxying of kernel system calls that makes possible this kind of program is implemented by FUSD, using a combination of a kernel module and cooperating user-space library. The kernel module implements a character device, /dev/fusd, which is used as a control channel between the kernel module and the user-space library. The fusd_register( ) function uses this channel to send a message to the FUSD kernel module, telling the name of the device the user wants to register. The kernel module, in turn, registers that device with the kernel proper using devfs. The devfs and the kernel do not know anything unusual is happening; it appears from their point of view that the registered devices are simply being implemented by the FUSD module.

When the kernel subsequently makes a callback due to a system call (e.g., when the character device file is opened or read), the FUSD kernel module callback blocks the calling process, marshals the arguments of the callback into a message and sends it to user-space. Once there, the FUSD user-space library unmarshals it and calls whatever user-space callback the FUSD driver passed to the fusd_register( ) function.

When the user-space callback returns a value, the process happens in reverse, wherein the return value and its sideeffects are marshaled by the library and sent to the kernel. The FUSD kernel module unmarshals this message, matches it up with a corresponding outstanding request, and completes the system call. The calling process is completely unaware of this trickery; it simply enters the kernel once, blocks, unblocks, and returns from the system call, just as it would for any other blocking call.

As a general example of a system call within a sensor node platform using the FUSD architecture, an application in user space reads from a device driver, but now the VFS calls the FUSD module's read callback. The FUSD module, or redirection module, resides in kernel space and serves mainly to redirect calls to drivers residing in user space, which may for example be written in C, Java, or other standard programming languages. Further, because the driver resides in user space it has access to all the user-space resources. The FUSD module calls the device driver callback, and the response propagates back to the original calling application. The semantics of the return variables under the FUSD architecture are exactly the same as if the device driver were in the kernel space. However, now it is possible to include a much broader set of functions in the driver, which can access user-space resources as well as make calls to other drivers within the kernel space.

Figure 6:
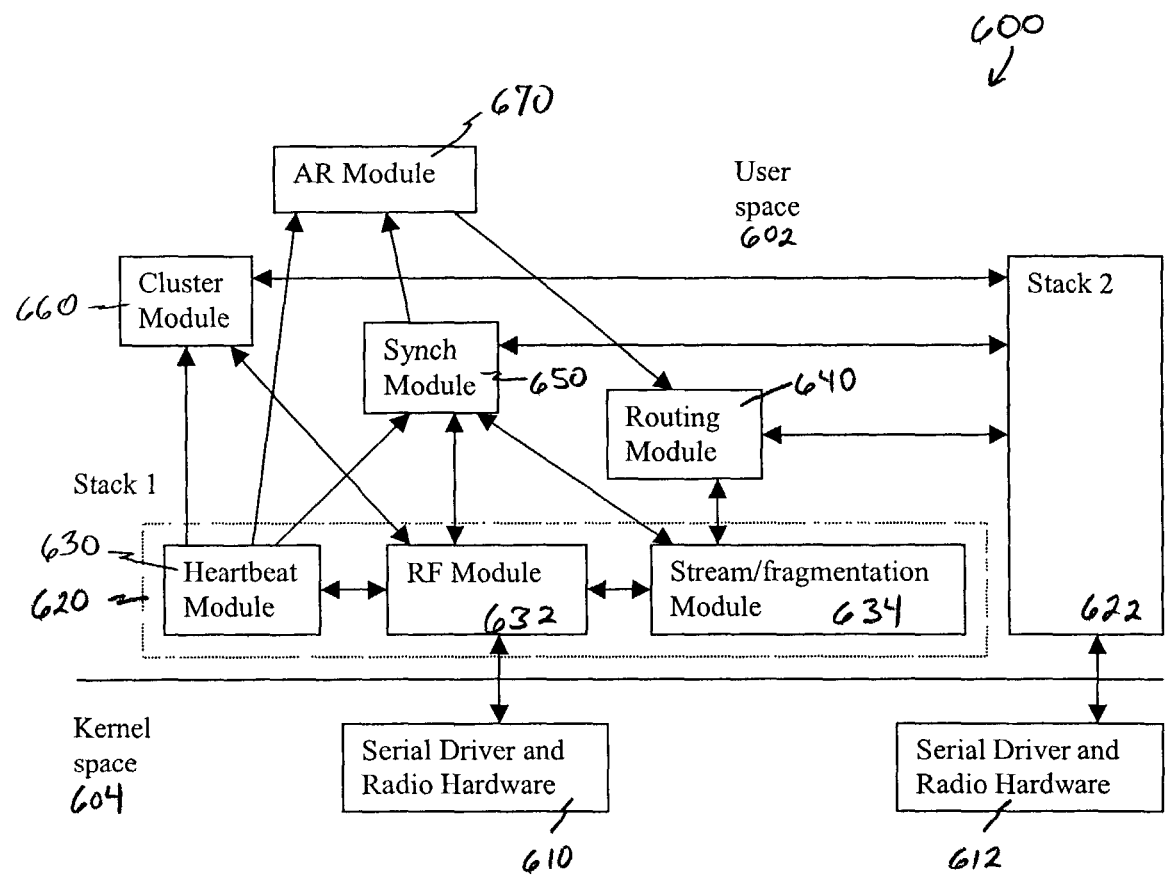
FIG. 6 is a block diagram of the software architecture of a multi-radio sensor node incorporating a language-independent user-space driver interface, under an embodiment.

The FUSD enables convenient control of the radios through a set of management tools residing in user space, which the application developer can access via device drivers for each software module. FIG. 6 is a block diagram of the software architecture 600 of a node incorporating a language-independent user-space driver interface, also referred to herein as a driver interface, under an embodiment. The multi-radio nodes 400 (FIG. 4) and 500 (FIG. 5) each host this architecture 600. Access to a hardware subsystem such as the radio hardware may be provided in one embodiment via a kernel-space serial port driver 610–612 on each node. Access to this serial port driver 610–612 is then provided in user space via FUSD so that at the lowest software layer, the RF modem driver 632 interfaces to each specific radio, and is dependent on the radio used. This driver 632 then presents a standard interface so that each higher layer module can operate over alternate radios having a driver in place, allowing only user space software changes to the specific radio driver 632 to use a separate radio over this serial connection. Interfacing above the RF modem driver 610–612 within the user space 602 of the communication network are stacks 620–622, each of which include three modules 630–634. The three modules include, but are not limited to, a heartbeat module 630 or link-monitoring module, an RF module 632, and a stream/fragmentation module 634.

Figure 7:
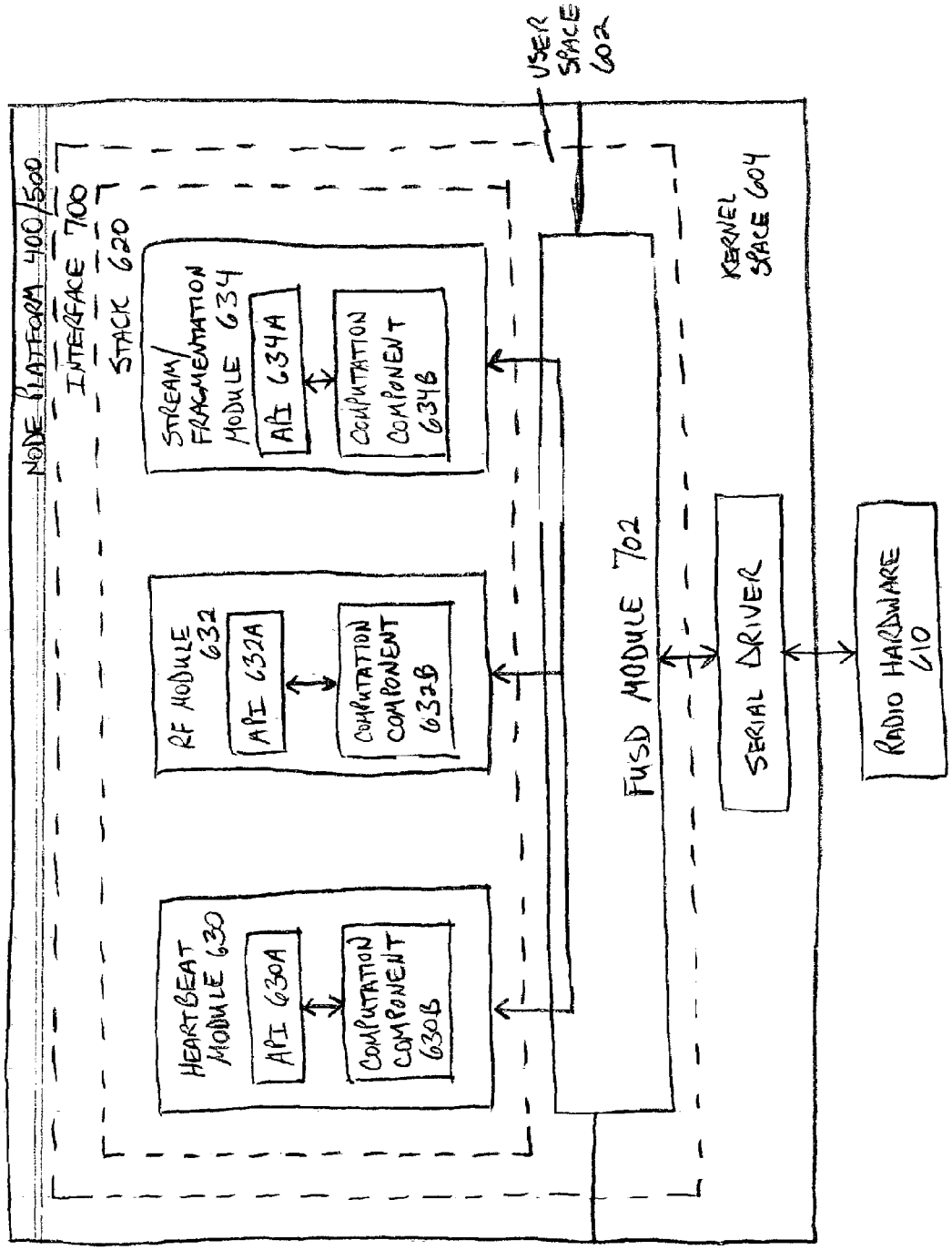
FIG. 7 is a block diagram of the user space/kernel space (US/KS) interface of a multi-radio node, under an embodiment.

FIG. 7 is a block diagram of the user space/kernel space (US/KS) interface 700, under an embodiment. The multi-radio nodes 400 (FIG. 4) and 500 (FIG. 5) each host this interface 600. Each of the heartbeat module 630, the RF module 632, and the stream/fragmentation module 634 include two components, an API 630A, 632A, 634A and a computational component 630B, 632B, 634B, coupled via a FUSD module 702. The API component of each module 630A, 632A, 634A resides in the associated stack 620 and 622 in user space 602. Each API component 630A, 632A, 634A couples to the corresponding computational component 630B, 632B, 634B that also resides in user space 602 via the FUSD module 702, thereby providing a language independent interface supporting standard POSIX calls just as a kernel-space device file. Thus, the US/KS interface 700 is expanded by the FUSD module 702 to provide device file access within user space to the serial driver and radio hardware as well as the API components 630A, 632A, 634A and computational components 630B, 632B, 634B of the heartbeat module 630, RF module 632, and stream/fragmentation module 634.

Figure 8:
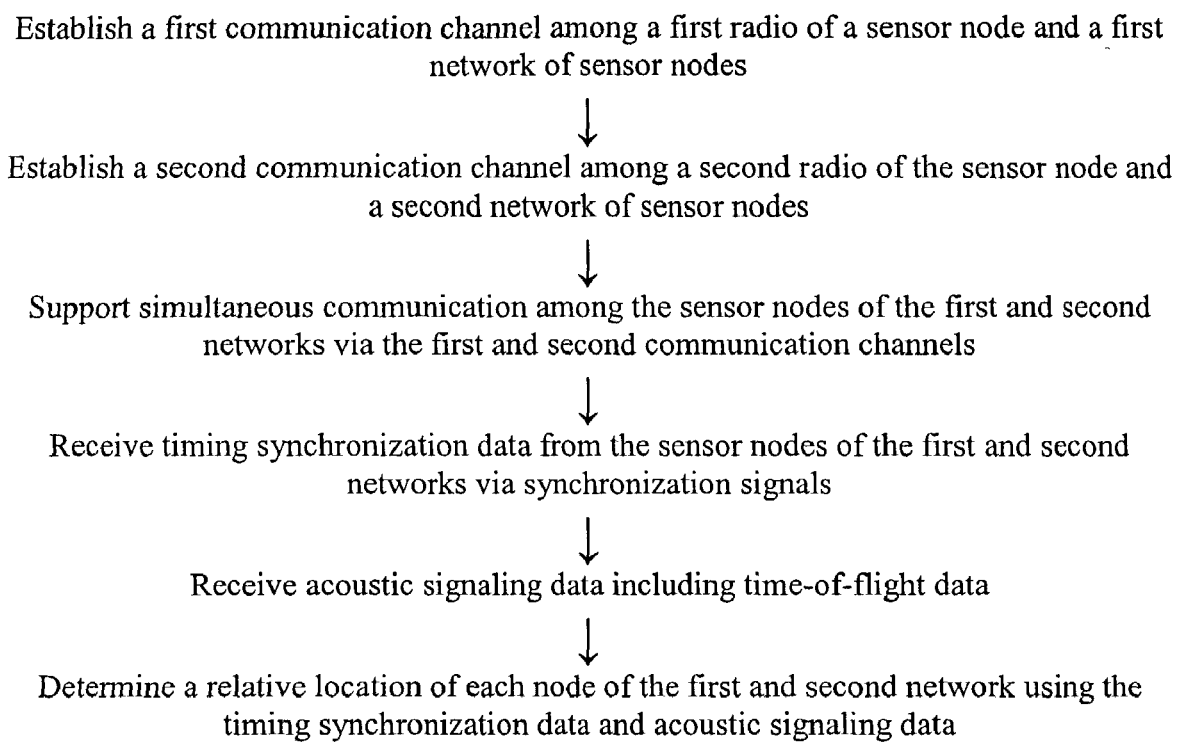
FIG. 8 is a flow diagram of a method of forming a sensor network of an embodiment.

The components 630–634 of each stack couple to a number of other user-space components including, but not limited to, a cluster module 660 or network discovery and self-assembly module, a synchronization module 650 or sync module, a routing module 640, and an acoustic ranging (AR) module 670. The heartbeat module 630 of each stack couples to the cluster module 660, the sync module 650, and the AR module 670. The RF module 632 of each stack couples to the cluster module 660 and the sync module 650. The stream/fragmentation module 634 of each stack couples to the sync module 650 and the routing module 640. The sync module 650 and routing module 640 also couple to the AR module 670. Each of these modules is described in further detail below. FIG. 8 is a flow diagram of a method of forming a sensor network under and embodiment, as described below.

Referring to FIGS. 6 and 7, the RF modem driver 610 and RF module 632 provide capabilities for multiple upper layer software modules 640–670 to send data over the node radios (via user space access through a FUSD device file) and for different systems to configure the radios through the standard API provided by the radio-specific RF driver 632. Radio-specific protocols are built into the RF modem driver 632 in order to provide a radio-independent API 700 to the upper layer software modules 640–670 of the node, with general configuration commands abstracted from the radio physical layer connection properties. The serial port driver 610 and RF driver 632 are flexible in allowing independent communication to as many radios as are on the node by running multiple versions of the driver for each device file (e.g., a serial port) connected to a modem. The RF module API 632A provides a language-independent API for higher layer software to use supporting standard POSIX-compliant system calls. The RF module API 632A also provides a useful debugging interface through command line-queriable device files reporting radio specific status information.

The node platform architecture of the embodiments described herein is consistent with the FUSD architecture described in the Related Applications in that multiple users (or multiple software modules) can access, monitor, and write to each software system, through a protected language independent device file. This allows for easy evaluation of module status, or radio status in the case of the radio driver.

In addition to enabling configuration of the radios, software operating at the highest layer of the RF modem driver 632 also parses large packets to utilize the maximum amount of data put into each packet as limited by the radio physical layer. This allows higher layer applications to send data as needed without being dependent on characteristics of individual radios. Alternatively, in order to ensure that a message including multiple packets gets through, the upper layer of the RF modem driver tracks the packet order and monitors the transfer of all message packets, for example the stream/fragmentation module 634.

Returning to FIGS. 6 and 7, the cluster module 660, or network discovery and self-assembly module, operates through the RF module 632 to configure the radios and set up the communication network autonomously. In operation, the cluster module 660 sets parameters of each RF modem driver 632 to form each local network cluster in order to ensure communication is possible across the network. The network nodes may for example operate in a TDMA cycle controlled by a base node, communicating to a number of remotes units. The network nodes of various alternative embodiments also support other communication protocols, including but not limited to, frequency division multiple access (FDMA), code division multiple access (CDMA), and orthogonal frequency division multiplexing (OFDM). This base/remote command is abstracted by the RF modem driver 632 to the role of one modem providing cluster synchronization while the other modems are adherents to that synchronization.

The cluster module 660 autonomously determines which modem 610–612 should act as the cluster synchronizer, based on the modems with which the cluster module 660 can directly communicate. In so doing, the cluster module 660 sets the role of each modem 610–612 of a node 400/500 by first assigning each modem of a node as a passive listener within each cluster (to determine if another node is synchronizing the network). Then, based on a schedule of which modems can be heard by the listening modems, the cluster module 660 either (1) offers to synchronize each modem with any other modem that the listening modem can hear, or (2) allows the listening modem to be synchronized by a node that the listening modem finds. The clustering algorithm of the cluster module 660 listens for a random period of time for other radios before attempting synchronization. The cluster algorithm also cycles between listening and attempting synchronization until each cluster stabilizes. Regarding synchronization, the cluster algorithm uses a minimum of other available nodes to synchronize (minimum number or remotes synchronized by each base with the current radios).

Once the cluster module 660 has assembled the individual clusters, the heartbeat module 630, or radio link-monitoring module, actively transmits a heartbeat signal over each connection of the cluster. The heartbeat signal transmits periodically, which in an embodiment is every N seconds (where N is easily configurable), plus or minus 30%, where the heartbeat time is randomized between each pulse. However, alternative embodiments may transmit heartbeat signals with a different periodicity and random dither. The heartbeat signals or packets are transmitted both ways through the cluster to ensure two-way communication.

Embedded within each heartbeat signal is a bit map that corresponds to the processes operating on each node of a cluster. The bit map allows nodes receiving the bit map to determine the operational status of neighboring nodes in addition to the operational status of the RF link. By actively testing the physical layer link within the heartbeat module 630, both the over-the-air connectivity and the interface to the radio are tested. For example, the heartbeat module 630 uses the same interface via the RF driver module 632 as any other software module of a node to communicate with the radio 610 (i.e., uses the device driver provided by the RF driver 632A), so that the heartbeat module 630 is continuously testing the communication channel exactly as seen on the node. This supports troubleshooting where, for example, the modem communicates fine over the air, but the radio firmware or even the radio driver is experiencing problems buffering data prior to sending it resulting in lost data.

Leveraging the heartbeat module 630 is the RF synchronization module 650, or sync module, which provides microsecond level accuracy between nodes. The sync module 650 is built independently of the heartbeat module 630 to easily allow the use of alternate broadcast messages for synchronization, and the integration of alternate synchronization modules. The synchronization operates above the heartbeat software but leverages the fact that each heartbeat packet is broadcast from the cluster module 660 and hence received by all the synchronized radios of a cluster at the same time, as described by J. Elson, L. Girod, and D. Estrin in "Fine-Grained Network Time Synchronization using Reference Broadcasts", submitted to SIGCOMM 2002. Thus each modem that receives the broadcast packet has a consistent time reference with all the other nodes synchronized in the same cluster.

The base or synchronizing radio does not have a reference time point based on its own broadcast "heartbeat", but since each node participates in two clusters, it has a reference time from the other cluster in which it participates. Since "heartbeat" packets are sent periodically, each node also conditions for drift in its own clock (based on temperature variations for example) with respect to its neighbors to ensure that once synchronized the nodes stay synchronized for as long as possible, even if no synchronization packets are received for a long period. In addition, with every node participating in two clusters, substantial cluster overlap occurs enabling multiple clusters to be synchronized.

The nodes 400/500 of an embodiment include any number of routing modules 640. The routing modules 640 operate over the clusters assigned by the cluster module 660 and over the links tested by the heartbeat module 630.

The nodes 400/500 of an embodiment use the AR module 670 to determine their relative locations to other local nodes with which they communicate. The AR module 670 determines the range and angle between local clusters of nodes and, from this range and angle data, builds a local coordinate system for these nodes using a multilateration module (not shown). Components of the AR module 670 including a merging algorithm that merges multiple local coordinate systems to create a field table. The field table includes the coordinates of many nodes. As an example, the field table may include coordinates for approximately fifty nodes, but is not so limited.

The AR module 670 leverages the inter-cluster synchronization provided by the heartbeat module 630 through its associated FUSD device driver. The heartbeat provides synchronization over RF, which can be abstracted beyond the local RF cluster. With this synchronization data each node can determine the range to other nodes based on a one-way acoustic time of flight. Each node that includes a modem operating as an RF base synchronizes all acoustic signaling within a local area. This coordination is abstracted from the topology dictated by the network cluster. Determination of the ranges to a sufficient number of neighbors is considerably enhanced by having clusters with a large degree of overlap, as is made convenient with nodes that employ two or more independent radios or modems.

Referring to FIG. 5, the AR modules 670 of an embodiment transmit a different coded acoustic chaotic sequence out of each of four speakers 550–552 of the host node 500. The transmission of these acoustic chaotic sequences is scheduled by the base node of each network cluster. As such, each node within a network cluster attempts to get the range and angle to every other node in the cluster.

The transmitted acoustic chaotic signals are received by the microphones 540–542 of each of the nodes that expect a signal, and correlated for each of the expected chaotic sequences. In the performance of the correlation, the sampled data on each of the four microphones 540–542 is also correlated with an alternate chaotic sequence to determine a representative noise level. Then, based on the correlated signal level, a signal-to-noise ratio (SNR) is assigned to each of the sixteen combinations of microphone/speaker pairs.

The assigned SNRs are used to determine whether or not to use the sampled data, as follows. To begin, signals from the various transmitting speakers are compared, and the speaker associated with the signal having the highest SNR values is chosen as the signal source for use in all processing (giving an indication that this speaker is pointed towards the receiving node). Signals from the four microphones sampling the signal received from the source speaker are then compared (if they have a large enough SNR) in order to provide both a range between nodes and an angle between nodes. The range between nodes is provided in the form of a weighted average, and the angle between nodes is determined from the weighted time of flight differences between each microphone pair.

The base node of each network cluster collects the range and angle data calculated between each pair of nodes between which it coordinated ranging. The base node generates a range table using this range and angle data. The range table is then used as input to a local multilateration module to determine a relative coordinate system for the list of nodes in the range table. An algorithm of the multilateration module should use a range and angle combination between these groups of nodes that is adequate to provide an initial guess for the location of nodes, from which an iterative least squares approach is used to generate a multilateration table.

In expanding the multilateration table to include location information of the nearest fifty or so neighbor nodes, the multilateration data from each base node is intelligently passed to approximately fifty of the nearest neighbor nodes. The AR module transmits the multilateration data using the routing module.

Upon receipt of the multilateration data, each node contains a collection of multilateration tables that are merged to provide a field table. Each node independently executes the merging in order to provide a field table having the local node as the table origin. Further, in order to minimize the error nearest each node, the merging is accomplished by starting with the largest multilateration table that contains the local node and then merging in each of the other multilateration tables based on the largest common node set. In this manner the nodes propagate field tables including very accurate node position information throughout their associate network.

The AR modules 670 update the field table by transmitting updates to the multilateration tables. The multilateration update tables are then merged into the field tables of each node. These updates include a number of status flags to signify the current state of each node, for example if it has been moved (tampered) but is still participating in the network or if it has disappeared from the network. In this manner the disappearance or appearance of a node from the network is passed via updates to the multilateration table within the network. These multilateration table updates also provide a mechanism by which a new node integrates into the network, and provide a soft state approach to system operation by providing information redundantly to each node.

Note from the above discussion that in the absence of RF synchronization the acoustic ranging would be difficult as the time of flight measurements are subject to unacceptable error. For successful position location many nodes have to determine their relative location. The connectedness of the multilateration tables is greatly improved when nodes may belong to multiple clusters. The multi-radio nodes described herein allow the required level of synchronization to be easily achieved and thus serve more than the single purpose of coordination of communications among nodes of a cluster.

Similarly, in pursuing applications such as acoustic or seismic beamforming, coherent data is needed as these applications share many of the properties of position location applications. Coherent data uses timing that is accurate to within a small fraction of one wave oscillation. Achieving such a level of synchronization across RF cluster boundaries would be difficult in the absence of overlapped cluster membership of nodes.

The overlapped cluster architecture provides not only low-latency connectivity, but also provides for improved robustness, capacity, and power efficiency compared to typical networking schemes. For example, in a typical pure hierarchical network configuration the cluster heads may be the only nodes with multiple radios and thus the only nodes capable of inter-cluster communication. This limits the number of routes and, due to propagation losses that are typically on the order of the fourth power of distance for ground-to-ground links, leads to increased power consumption.

By contrast, where other nodes of the cluster can serve as relays there are more paths available for getting around obstacles (such as structures and surface relief), and each link is shorter thereby reducing the total transmitted power along the path. This architecture also provides the secondary benefit of decreased probability of interception of communications and improved resistance to jamming. Additionally, since two radios are active, overall network capacity is increased.

Figure 9:
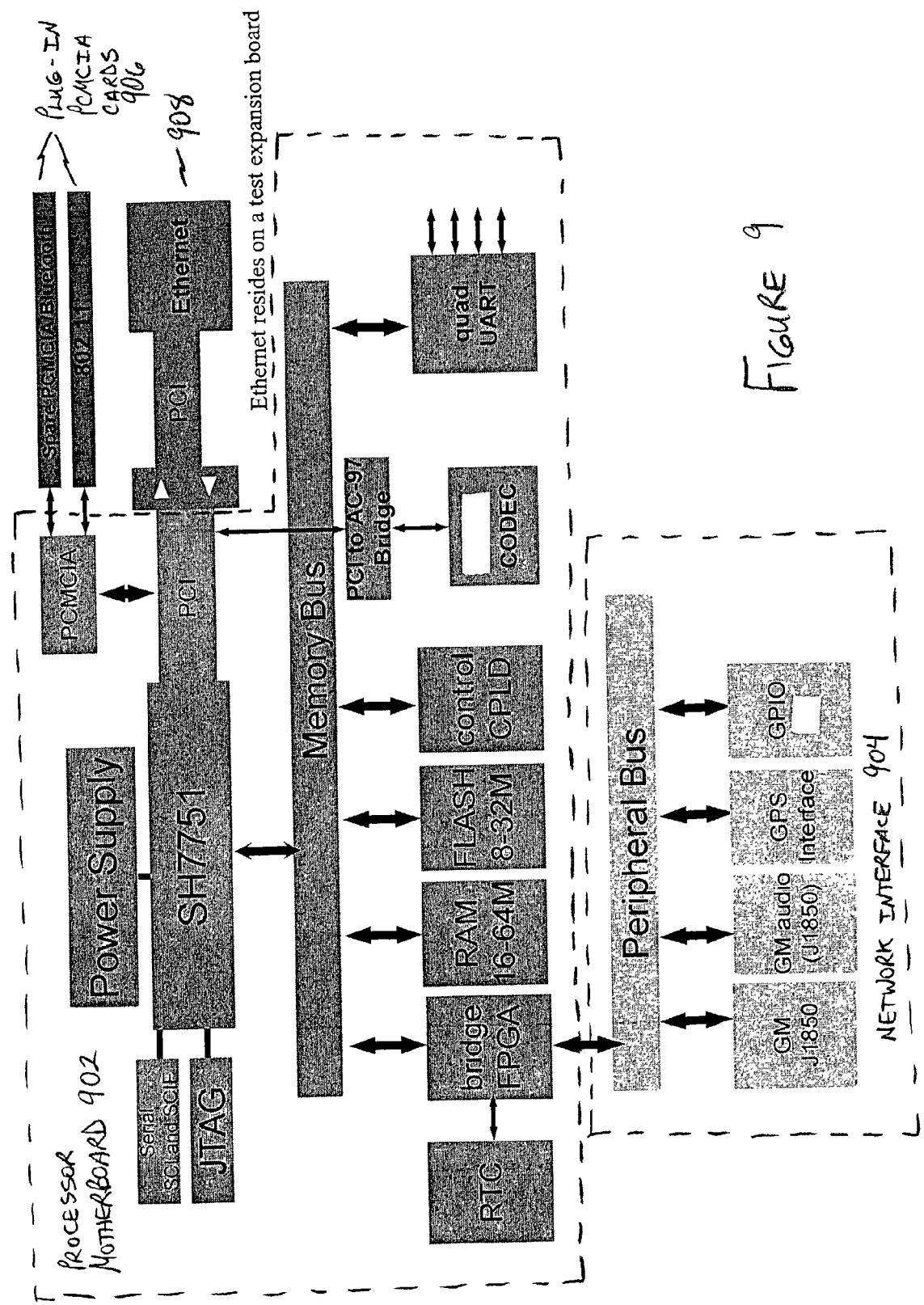
FIG. 9 is a block diagram of a multi-radio node, under another alternative embodiment.

FIG. 9 is a block diagram of a multi-radio node 900, under another alternative embodiment. This node 900 includes a processor motherboard 902 and a network interface 904. The motherboard 902 of an embodiment accepts at least two plug-in Personal Computer Memory Card International Association (PCMCIA) cards 906 and an Ethernet card 908. The motherboard 902 supports operation as a multi-radio node when configured with an 802.11b radio port in the Ethernet port 908 and two 802.11a radio ports in the PCMCIA ports 906.

The processor motherboard 902 includes the power supply, PCMCIA slots and interfaces, SH7751, PCI, Serial SCI and SCIF, JTAG, Memory Bus, RTC, bridge field programmable gate array (FPGA), random access memory (RAM) 16–64 M, flash memory 8–32 M, control complex programmable logic device (CPLD), PCI to AC-97 Bridge, CODEC, and quad universal asynchronous receiver transmitter (UART). The network interface includes a peripheral bus, GM J1850 (audio) bus (vehicle applications), GPS interface, and general purpose input/output (GPIO), but alternative embodiments support numerous different interface options. The test expansion board is shown with an Ethernet board, but also supports an IEEE 802.11 radio port. Plug-in PCMCIA cards include IEEE 802.11 radio ports, and a spare, which might be used for Bluetooth.

With the configuration depicted, the SH7751 is the host for the node software architecture described above. The use of multiple additional processors enables many critical real-time management functions to be offloaded from the main processor, allowing determinism without requiring a special operating system. As described in the Related Applications, with respect to vehicle gateways with both a main processor and logic comprising a real-time interface processor (RTIP), systems with this general architecture enable convenient hosting of applications while also assuring real-time operation.

The processor of an embodiment is a Hitachi HD6417751F167, but is not so limited. The SH7751 can be programmed via a 14-pin JTAG header on the core board.

This header is accessible when the board stack is removed from the nodes enclosure. The SH7751 has two native serial ports. The SCI port is used to communicate with the PCI, which controls the power state of the system. This port is used in a SPI mode where the SH7751 acts as a slave. The SCIF port on the SH7751 exits the gateway via the main connector at RS232 levels with full flow control.

The RAM on the board is scalable from 16 megabytes (M) to 64 M in 16 M increments. This is implemented by chip selection and the choice of the number of chips populated. The chips are populated in pairs. Using two chips that are 16 bits wide allows a 32-bit write which is twice as fast as two 16-bit writes.

The flash memory on the board is scalable from 8 M to 32 M in 8 M increments. This is implemented by chip selection and the choice of the number of chips populated. The chips are populated in pairs. Using two chips that are 16 bits wide allows a 32-bit write which is twice as fast as two 16-bit writes.

The FPGA is responsible for aiding the SH7751 in controlling several devices on the core board. The address bus, data bus, chip selects, and IRQs of the SH7751 are routed to the FPGA so that they may be decoded before interfacing with other devices. The FPGA interfaces with the quad UART, the network interface 904, and the CODEC and generates GPIOs, which are used for debugging. The FPGA can be programmed either through the SH7751 or a 5-pin JTAG header on the core board.

The node architecture of an embodiment further supports nodes including radios supporting different protocols. The use of different protocols on the same platform is found in hierarchical networks, for example, where base nodes have improved power supplies, antenna elevation, or simply more powerful radios. The separation of functions among the local networking and the longer range multi-hop network can simplify operations in hierarchical networks.

Figure 10:
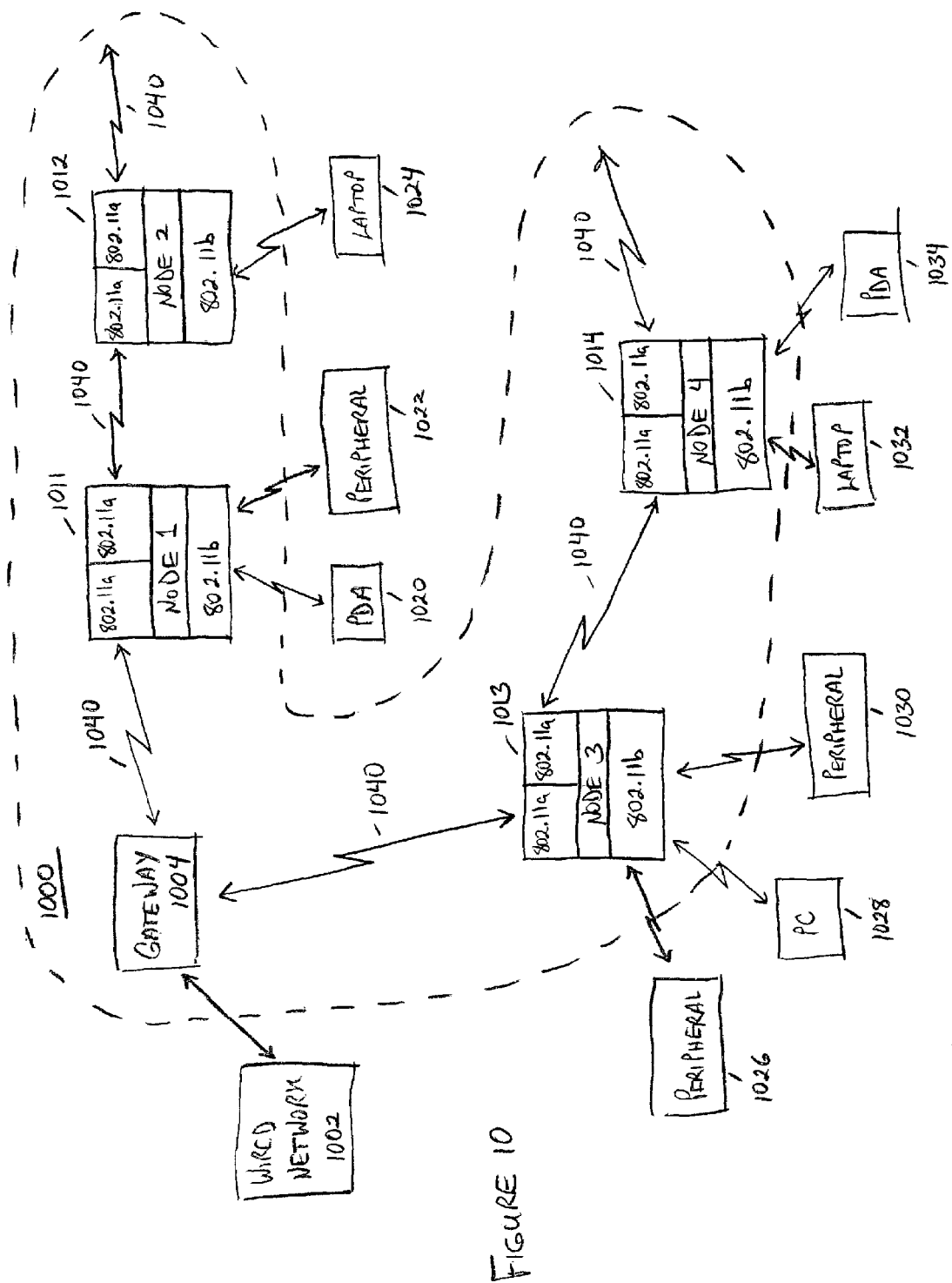
FIG. 10 is a block diagram of an IEEE 802.11 access network including the multi-radio nodes of an embodiment.

FIG. 10 is a block diagram of an IEEE 802.11 access network 1000 application including the multi-radio nodes of an embodiment. The installation of an 802.11 access network 1000 in a hospital, airport, mall, or other structures in which stringing new communications cable to the access points is costly and difficult in the absence of the multi-radio nodes. Further, use of portable wireless devices alone to actually perform the multi-hop routing is complicated, unreliable (due to their motion), and would demand operating their protocols in an irregular mode. However, the multi-radio nodes of an embodiment facilitate provision of a wireless access network as described below.

With reference to FIG. 10, the access network 1000 presents a network access point to the end-user that appears to be the same as that of a wired network. The nodes 1011–1014 that support this access network 1000 under an alternative embodiment include at least three radios, and more radios can be included to support alternative network configurations. The three radios include two 802.11a radios that establish a high-speed low-latency multi-hop backbone. The third radio of the node is an 802.11b radio that provides local access for portable electronic devices 1020–1034 like laptop computers and other portable devices equipped with wireless capability. The network access nodes 1011–1014 support the provision of multiple paths 1040 between any given access point 1011–1014 and the gateway 1004 to the wired network 1002, thereby providing reliable network access under failures of any given element. The overlapping cluster algorithms described above can then be applied to the formation of the multi-hop access radio wireless backbone.

Alternative embodiments of the access network 1000 may include nodes 1011–1014 with three 802.11a radios, nodes 1011–1014 with three 802.11b radios, and/or nodes 1011–1014 with various other combinations of 802.11a/802.11b radios. Additionally, alternative embodiments of the access network 1000 may include nodes 1011–1014 that support various other communication protocols or wireless local area network (LAN) standards.

The multi-radio node hardware and software described herein and in the Related Applications provides a convenient means of implementing these access networks. The capability for local control over resources such as radio ports supports provision of differentiated quality of service and security without the need for large back-end servers in each installation. The local control over resources further enables remote upgrade of this software. The enterprise-level software provides the capabilities for multiple Internet service providers to be supported, giving economies of scale in the user population.

The multi-radio nodes of an embodiment are also useful in combination with multi-hop systems known in the art. For example, consider deployment of sensor networks in a security application wherein certain critical locations require coverage by a field of sensors, with a large gap between the critical locations and a command post that receives the sensor information. In this case, there is a need for longer range radios to overcome the gaps in the network. Use of the multi-radio nodes across the gap provides multi-hop coverage over these long-range links while requiring less power than when attempting to bridge the link in one hop. Use of multiple radios for each long-range relay also provides low latency across the link. The overlapping cluster algorithms described above may be used at each level of this network hierarchy.

The multi-radio nodes described above are not limited to use in local networks of a star architecture, as they may be used with numerous other network protocols to establish both network clusters and/or flat networks. Even with other network protocols, use of the multi-radio nodes enables higher communication throughput (in not having to time share as much on connections) and simplifies synchronization and channel assignment.

The use of multiple radios on nodes within a sensor or wireless access network provides for efficient leveraging of single cluster protocols to provide low latency multi-hop networks. Multiple radios also facilitate node self-location and coherent combination of data, while providing a more densely connected and more robust network. Numerous embodiments have been described above, and it will be apparent to those skilled in the art that many more alternative embodiments are possible.

Aspects of the embodiments described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the embodiments include: microcontrollers with memory (such as electronically erasable programmable read only memory (EEPROM)), embedded microprocessors, firmware, software, etc. Furthermore, aspects of the embodiments herein may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," and words of similar import, when used in this application, shall refer to this application as a whole and not to any particular portions of this application.

The above description of illustrated embodiments of the invention is not intended to be exhaustive or to limit the invention to the precise form disclosed. While specific embodiments of, and examples for, the invention are described herein for illustrative purposes, various equivalent modifications are possible within the scope of the invention, as those skilled in the relevant art will recognize. The teachings of the invention provided herein can be applied to other network systems, not only for the network systems described above.

The elements and acts of the various embodiments described above can be combined to provide further embodiments. Aspects of the invention can be modified, if necessary, to employ the systems, functions and concepts of the various references and applications described above to provide yet further embodiments of the invention.

These and other changes can be made to the invention in light of the above detailed description. In general, the terms used in the following claims should not be construed to limit the invention to the specific embodiments disclosed in the specification and the claims, but should be construed to include all network systems that operate under the claims. Accordingly, the invention is not limited by the disclosure, but instead the scope of the invention is to be determined entirely by the claims.

While certain aspects of the invention are presented below in certain claim forms, the inventors contemplate the various aspects of the invention in any number of claim forms. Accordingly, the inventors reserve the right to add additional claims after filing the application to pursue such additional claim forms for other aspects of the invention.

We claim:

1. A network comprising a plurality of local network clusters that each include one or more nodes, wherein each of the nodes includes a plurality of communication radios that each support communication among the nodes so that simultaneous communications are supported among the nodes, wherein each node includes a subsystem for providing shared resource access management among two or more applications, wherein the resources include the communication radios, the subsystem including a routing module coupled to a radio driver interface, the routing module configured to receive radio access requests from the applications and generate calls representative of the received requests to the radio driver interface, the radio driver interface configured to receive the calls and in response determine radio availability using resource status information of the node, generate schedules wit the resource status information for granting access to the requested resources, and control access to the radios by the applications according to the generated schedules.

2. A node comprising two or more communication devices, wherein each communication device supports simultaneous communications among nodes of two or more respective independent network clusters, wherein the communication devices include radio frequency (RF) devices, wherein the node includes a subsystem for providing shared resource access management among two or more applications, wherein the resources include the communication devices, the subsystem including a routing module coupled to a radio driver interface, the routing module configured to receive radio access requests from the applications and generate calls representative of the received requests to the radio driver interface, the radio driver interface configured to receive the calls and in response determine communication device availability using resource status information of the node, generate schedules with the resource status information for granting access to the requested resources, and control access to the communication device by the applications according to the generated schedules.

* * * * *